UNITED STATES PATENT OFFICE.

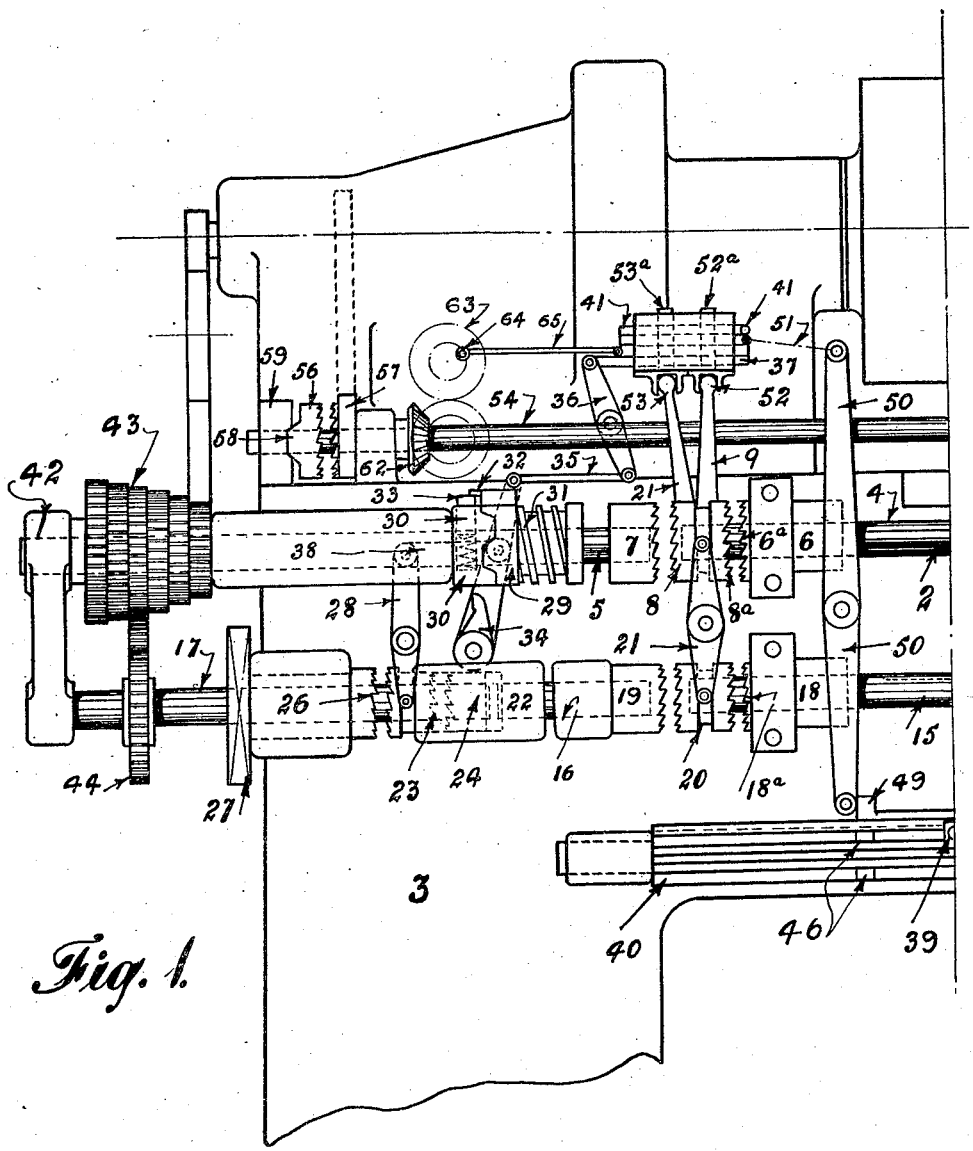

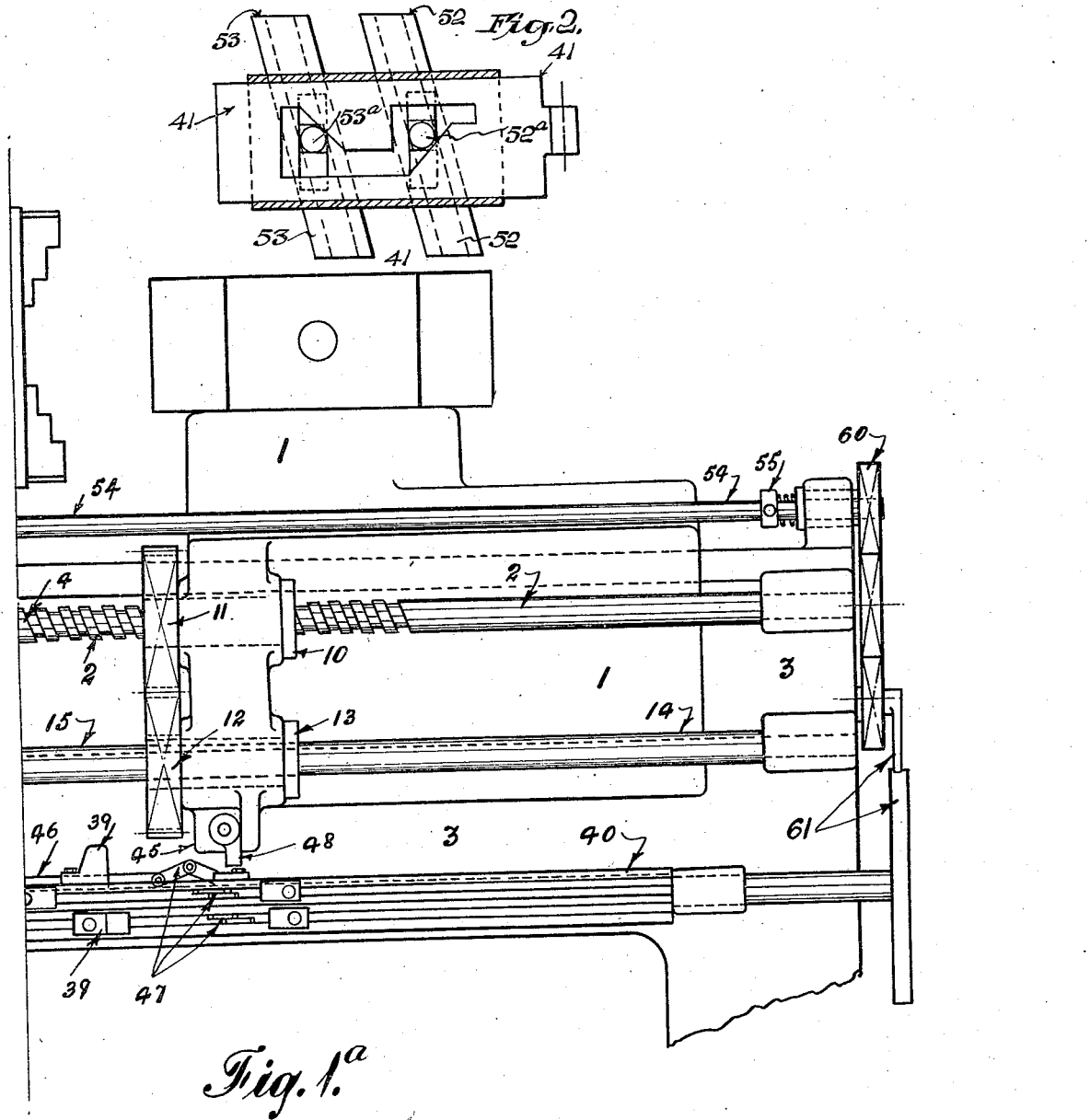

ALEXANDER STIRLING BURNETT, OF REDDISH, ENGLAND.

MACHINE TOOL.

1,419,812.  Specification of Letters Patent.  Patented June 13, 1922.

Application filed October 25, 1921. Serial No. 510,389.

*To all whom it may concern:*

Be it known that I, ALEXANDER STIRLING BURNETT, a subject of the King of Great Britain and Ireland, residing at Reddish, in the county of Chester, England, have invented new and useful Improvements in or Relating to Machine Tools (for which I have filed an application in Great Britain and Ireland No. 15,231, June 5, 1920), of which the following is a specification.

This invention relates to improvements in machine tools and has for its main object to provide an improved automatically controlled traversing motion.

According to the invention, the tool saddle or part to be reciprocated is traversed by a screwed spindle journaled in the bed of the tool, and engaging a nut rotatably mounted on the moving part. Said nut is provided with a toothed wheel meshing with a corresponding wheel also rotatably mounted in the movable part and bored to receive a spindle extending the length of the screwed spindle, said spindle being also journaled in the bed of the tool and having a key-way formed therein to engage a feather in the boss. Motion is imparted to the screwed and splined spindles through clutches, controlled by selector mechanism, automatically actuated by or from the moving member, the gear ratios of the geared nut and wheel, being such that with both spindles rotating, a slow feed motion is obtained, and the controlling mechanism so arranged that one or other of the spindles can be rotated independently of the other to obtain a fast backward or reverse motion respectively.

The invention will be described as applied to a turret-lathe by the aid of the accompanying drawings, wherein:—

Fig. 1 is an elevation partly diagrammatic showing the head stock end of a turret lathe with the invention applied, and Fig. 1$^a$ is a corresponding view of the turret end of the lathe.

Fig. 2 is a detail view of one of the control plates.

Referring to the drawings the tool saddle 1 or part to be reciprocated is traversed by a screwed spindle 2 journaled in the bed of the tool 3 and formed in two parts 4 and 5. The adjacent ends are provided with clutch elements 7 and 8 respectively having oppositely disposed complemental serrations or teeth adapted to interengage. The sliding clutch 8 is actuated by a rocking lever 9 as hereinafter described and teeth 8$^a$ on the opposite side of the same engage complemental teeth 6$^a$ on the stationary spindle bearing 6. The screw 2 engages a nut 10 rotatably mounted on the saddle, said nut being formed in one with or having secured thereto a toothed wheel 11 which meshes with a corresponding wheel 12 having a boss 13 also rotatably mounted in the movable saddle and bored to receive a spindle 14 extending the length of the screwed spindle 2, said spindle being also journaled in the bed of the tool and having a keyway formed therein to engage a feather in the boss. The spindle 14 is formed in two parts 15 and 16 of which the adjacent ends are provided with clutch elements 19 and 20 the latter having oppositely disposed teeth at opposite ends adapted to selectively engage the complemental teeth on the clutch element 19 or the teeth 18$^a$ on the stationary spindle bearing 18 when actuated by the rocking lever 21 in like manner to the lever 9 as hereinafter explained.

At the opposite end of the portion 16 of the shaft 14 is a sliding sleeve 22 splined on the spindle 16 and having internal teeth 23 to engage complemental teeth on a clutch element 24 rigidly secured to the spindle 17 in line with the shaft 14 and external teeth 25 to engage complemental teeth on the boss 26 of a gear wheel 27 surrounding the spindle section 17 and journaled in the bed of the machine. The sleeve 22 is reciprocated by a rocking lever 28 so that when moved to the left the spindle 16 is clutched to the rapid traverse gear 27 so that a constant quick traverse for the idle back movement may be obtained and when moved to the right the spindle 16 is clutched to the spindle 17 to obtain a feed motion varying with the spindle speed as hereinafter explained.

Slidably mounted upon the spindle 2 is a tubular member 29 forced into engagement with a fixed collar 30 on the said spindle by a spring 31 the meeting surfaces having complemental inclined planes, a projection 32 on the member 29 normally serving to retain a plunger 33 in the retracted position, said plunger is slidably mounted in a traverse bore in the collar 30, a spring in said bore normally tending to force the plunger outwardly. Said plunger, when in the retracted position rotates with the collar 30 without contacting with a lever 34 but when the projection 32 is withdrawn the plunger is forced outwards and during its next revolution strikes the lever 34 and rocks the same, the movement being imparted through the link 35 and lever 36 to a plate 37 controlling one lever 9 and through the link 38 and lever 28 to the sleeve 22 whereby the clutch 8 is moved to unclutch the spindle 4 from the driving gear and cause the teeth 8ᵃ to engage the stationary teeth 6ᵃ to prevent movement of the spindle 4 and simultaneously the sleeve 22 is moved to clutch the spindle 16 to the fast drive 27.

A series of stops 39 are provided for arresting the saddle, said stops being adjustably mounted on a stop bar 40 which is of hexagonal shape in cross section, each flat side being slotted to form a rail to which the stops 39 proper are adjustably clamped, one on each face or rail and adapted to be engaged by a projection 45 on the saddle 1.

Mounted upon or in each side or rail is a sliding bar 46 connected at one end to the outer end of one of a pair of toggle links 47, the outer end of the other link of which is adjustably connected to the stop bar 40 and the arrangement being such that the toggle 47 is normally broken and the mid-portion raised into the path of a one-way trip lever 48 on the saddle 1 so as to be depressed by said trip lever to cause the sliding bar 46 to be reciprocated and the free end (or projection 49 thereon) to strike against and actuate one element of the feed selector mechanism, which, comprises control plates 41 in order to effect the slow cutting feed. This can be conveniently effected by causing the sliding rod 46 to strike one arm of a lever 50 the other arm of which is connected by a connecting rod 51 to the third of the series of control plates 41 each of which have cam surfaces (see Figure 2) adapted to actuate two slides 52, 53 free to slide transversely of the machine and engaging the control levers 9, 21 of clutches 8 and 20 on the screwed and splined spindles 2 and 14 respectively by means of which the feed is imparted to the turret saddle as hereinafter described. The slides 52 and 53 have upstanding projections 52ᵃ and 53ᵃ respectively which pass through all the control plates 41 and 37 the disposition of the cam surfaces on each control plate being such that the projections 52ᵃ and 53ᵃ are free to be moved by the next control plate. The slides 52 and 53 are inclined transversely of the machine, see Figure 2, so that during the transverse movement of said slides due to the action of the cam plates on the upstanding projections, movement longitudinally of the machine is imparted to the top end of the levers 9 and 21.

A one revolution shaft 54 is capable of endwise movements, and is provided with an adjustable stop collar 55 against which the saddle 1 strikes at the end of the fast backward motion to impart such endwise movement which carries forward a serrated clutch element 56 into engagement with serrations on a continuously revolving gear wheel 57 or pulley driven from the head-stock spindle, back-shaft or other convenient source of power. The moving clutch element 56 is formed with a projection 58 at the end opposite to the serrated end, which normally enters a recess in a relatively fixed boss or bracket 59 surrounding the spindle the arrangement being such that when endwise movement is imparted to the one revolution shaft 54 by the saddle, the clutch element 56 is moved into engagement with the continuously rotating element 57 and the projection 58 is moved clear of the recess in the fixed part 59 so that as the one revolution shaft 54 is rotated, the projection 58 slides over the front face of the fixed bracket 59, but immediately said projection comes again into register with the recess in said bracket the one revolution shaft 54 is then free to return to the position where the clutch element 56 is disengaged. During this operation a gear wheel 60 keyed to said shaft imparts motion to the stop bar 40 and which is indexed one sixth of a revolution through a geneva motion 61 actuated by the pinion 60 mounted on the one revolution shaft through suitable gearing.

A further pinion 62 on the one revolution shaft drives a gear wheel 63 having a crank pin 64 thereon which periodically actuates the second control plate 41 through a suitable connecting rod 65, the first control plate 37 being actuated from the tubular member 29 as before explained.

The sections 5 and 17 of the spindles 2 and 14 are positively driven the section 5 being geared to a positively driven counter shaft and having thereon a series of different sized gear wheels 43. The gear wheel 44 is slidably mounted so as to be capable of being driven by any of said wheels 43 through the intermediary of an idler wheel mounted to allow for variations in the size of the wheels 43.

It will now be seen that if the two spindles 2 and 14 were rotated at the same speed no movement would be imparted to the saddle or turret and in order to create a slow cutting feed the gear ratios are such that the spindle 14 is driven slightly slower than the spindle 2 through the change gears, the changes being automatic and permitting of a wide range of feeds.

The operation of the machine is as follows: Assuming that the tool is nearing the end of the cutting stroke, i. e., with the clutches 8 and 20 of the screwed and spline feed spindles respectively in driving connection; when the required distance is reached the projection 45 on the turret slide contacts with the stop 39 on the top side of the stop bar and prevents the turret slide moving further forward. This causes the tubular member 29 on the screwed shaft 2 to move forward by reason of the contacting inclined surface and releases or actuates the plunger or tappet 33 which in turn actuates the lever 34 interconnected with the control plate 37 through the members 35, 36. The movement of the first control plate 37 actuates the clutch 8 on the screwed spindle 2 so as to disconnect said spindle, thereby causing a fast backward motion through the medium of the spline shaft and gears which are still running. This backward motion is sustained until the turret 1 comes in contact with the collar on the one revolution shaft and causes endwise movement of the same against the pressure of a spring to clutch the same to the rotor 57.

During the rotary movement of the one revolution shaft 54 the crank pinion 63 to which it is geared rotates and actuates the second control plate 41 which disconnects the spline shaft clutch 20 and re-engages the screwed spindle clutch 8 thus effecting a reversal of the fast motion at any predetermined point governed by the position of the stop collar 55 on the one revolution shaft 54. Simultaneously the geneva motion 61 is actuated from said one revolution shaft 54 through the inter-connecting gearing whereby the stop bar 40 is indexed one sixth of a revolution.

During the fast forward movement of the saddle the one way trip 48 thereon strikes the before mentioned toggle 47 on the top of the stop bar 40 and reciprocates the sliding bar 46 to which it is connected, which in turn rocks the lever 50 so as to impart motion to the third control plate 41 which serves to re-clutch the spline shaft, said spline and screwed spindle then both rotating in order to give the slow cutting feed, at the end of which the projection 45 on the saddle 1 contacts with the stop 39 on the stop bar 40 and the cycle of movement is repeated.

The engagement of the teeth on the sliding clutches 8 and 20 with the teeth on the stationary spindle bearings 6 and 18 prevent any movement being imparted to the spindles when declutched owing to frictional engagement of the parts.

As it is desired to maintain the idle motions at the maximum speed whilst allowing of variation of speed of the cutting motion the sliding clutch sleeve 22 is actuated from the lever 34 movement being imparted to the spindle 14 through said sleeve either from the positively driven section 17 or the gear wheel boss 26.

In traversing motions constructed according to the present invention cam movements are dispensed with and any length of traverse can be obtained, the length of traverse only being limited by the length of the leading screw and such traversing motion may be applied to other types of machine tools. Further, it is possible to obtain a wide range of feed or quick return motion of the carriage.

What I claim is:—

1. A traversing motion for machine tools comprising in combination a moving member two spindles, interconnected with the moving member, means to rotate said spindles intermittently at different speeds, control mechanism to govern the rotation of said spindles and means to selectively and automatically actuate the control mechanism in synchronism with the movements of the moving member, so that the rotation of one spindle causes a fast forward motion of the moving member and the rotation of the other spindle causes a fast backward motion, whilst the simultaneous rotation of both spindles causes a slow feed motion.

2. A traversing motion for machine tools comprising in combination a moving member a screwed spindle and a splined spindle, a geared nut on the screwed spindle rotatably mounted on the moving member, a gear wheel slidably mounted on the splined spindle and geared to the nut, means to drive both spindles at different speeds relatively to each other, clutches through which the drive is imparted to the spindles, selector mechanism for controlling the movements of the clutches and means for automatically actuating the selector mechanism in synchronism with the movements of the moving member so that the rotation of one spindle causes a fast forward motion of the moving member and the rotation of the other spindle causes a fast backward motion, whilst the simultaneous rotation of both spindles causes a slow feed motion.

3. A traversing motion for machine tools having a relatively moving member comprising, in combination a screwed spindle and a splined spindle each of which is formed in two parts, and has a clutch for connecting the two parts, a sliding member on one spindle adapted to engage a fixed member on the same spindle under spring pressure, the sliding and fixed members having complemental inclined planes, stop mechanism for arresting the movement of the moving member, selector mechanism for selectively actuating the clutches and means for automatically actuating the selectors, a nut on the screwed spindle geared to a pinion on the splined shaft and adapted to impart motion to the moving member, substantially as described.

4. A traversing motion for machine tools having a relatively moving member comprising in combination a screwed spindle and a splined spindle each of which is formed in two parts and has a clutch for connecting the two parts, a sliding member on one spindle adapted to engage a fixed member on the same spindle under spring pressure the sliding and fixed members having complemental inclined planes, stop mechanism for arresting the movement of the moving member, selector mechanism for selectively actuating the clutches, and means for automatically actuating the selectors, a nut on the screwed spindle geared to a pinion on the splined shaft and adapted to impart motion to the moving member together with a second clutch adapted to be automatically actuated by the selector mechanism to clutch one of said spindles to either of two sets of driving gear, substantially as described.

5. A traversing motion for machine tools having a relatively moving member comprising in combination a screwed spindle and a splined spindle each of which is formed in two parts and has a clutch for connecting the two parts, a sliding member on the screwed spindle adapted to engage a fixed member on the same spindle under spring pressure the sliding and fixed members having complemental inclined planes, stop mechanism for arresting the movement of the moving member, selector mechanism for selectively actuating the clutches, and means for automatically actuating the selectors, a nut on the screwed spindle geared to a pinion on the splined shaft and adapted to impart motion to the moving member together with a second clutch adapted to be automatically actuated by the selector mechanism to clutch one of said spindles to either of two sets of driving gear, substantially as described.

In testimony whereof I have signed my name to this specification.

ALEXANDER STIRLING BURNETT.